(12) United States Patent
     Krämer

(10) Patent No.: US 11,237,934 B2
(45) Date of Patent: Feb. 1, 2022

(54) METHOD FOR ERROR MANAGEMENT IN BUS COMMUNICATION AND BUS COMMUNICATION SYSTEM

(71) Applicant: KROHNE Messtechnik GmbH, Duisburg (DE)

(72) Inventor: Julian Krämer, Mülheim (DE)

(73) Assignee: KROHNE Messtechnik GmbH, Duisburg (DE)

( * ) Notice: Subject to any disclaimer, the term of this patent is extended or adjusted under 35 U.S.C. 154(b) by 308 days.

(21) Appl. No.: 16/450,397

(22) Filed: Jun. 24, 2019

(65) Prior Publication Data

US 2019/0391894 A1 Dec. 26, 2019

(30) Foreign Application Priority Data

Jun. 22, 2018 (DE) .......................... 102018115100.4

(51) Int. Cl.
| | |
|---|---|
| *G06F 11/30* | (2006.01) |
| *G06F 13/42* | (2006.01) |
| *G06F 11/07* | (2006.01) |
| *G06F 11/34* | (2006.01) |

(52) U.S. Cl.
CPC ........ *G06F 11/3027* (2013.01); *G06F 11/349* (2013.01); *G06F 13/42* (2013.01)

(58) Field of Classification Search
CPC ... G06F 11/0751; G06F 11/3027; G06F 13/42
See application file for complete search history.

(56) References Cited

U.S. PATENT DOCUMENTS

2004/0054829 A1   3/2004   White, III et al.

FOREIGN PATENT DOCUMENTS

| EP | 0837394 A2 | 4/1998 |
|---|---|---|
| WO | 03027685 A2 | 4/2003 |
| WO | 2007059823 A1 | 5/2007 |

OTHER PUBLICATIONS

European Search Report Application No. EP 19 17 8778 Completed: Nov. 12, 2019; dated Nov. 28, 2019 6 pages.

*Primary Examiner* — David E Martinez
(74) *Attorney, Agent, or Firm* — Whitmyer IP Group, LLC

(57) ABSTRACT

A method for error management in bus communication is disclosed. A first bus subscriber generates a first bus message and writes a bus error code into a bus data area of a first bus message. The second bus subscriber identifies the error by evaluating the bus error code. The first bus subscriber stores an error identification of the error, generates a first bus message and writes the bus error code into the bus data area of the first bus message. A second bus message with a request for transmission of the error identification is generated by the second bus subscriber. A third bus message is generated by the first bus subscriber and the stored error identification is written into the bus data area of the third bus message. The second bus subscriber identifies the errors by evaluating the bus error code and the error identification.

19 Claims, 3 Drawing Sheets

METHOD FOR ERROR MANAGEMENT IN BUS COMMUNICATION AND BUS COMMUNICATION SYSTEM

TECHNICAL FIELD

The invention relates to a method for error management in bus communication according to a bus protocol between a first bus subscriber and a second bus subscriber. The bus protocol for this method defines at least one bus error code for an error and bus messages with a bus data area. If the error is detected by the first bus subscriber, the following is executed. A first bus message is generated by the first bus subscriber and the bus error code is written into the bus data area of the first bus message. The first bus message is transmitted from the first bus subscriber to the second bus subscriber. The error is identified by the second bus subscriber by evaluating the bus error code. The invention also relates to a bus communication system with a first bus subscriber, a second bus subscriber and a bus. The first bus subscriber and the second bus subscriber are designed for bus communication between one another via the bus according to a bus protocol. The bus protocol defines at least one bus error code for an error and bus messages with a bus data area, as in the method. The first bus subscriber is designed to detect the error and is triggered by the detection of the error to generate a first bus message and to write the bus error code into the bus data area of the first bus message. The second bus subscriber is designed to identify the error by evaluating the bus error code.

BACKGROUND

Bus communication systems with bus subscribers are used, for example, in process automation. Process automation deals with the automation of industrial processes, such as manufacturing processes. Industrial processes are influenced by actuators and monitored by sensors. Actuators are, for example, control elements and valves and sensors are, for example, flow, level, temperature, pressure, analysis, gas or steam measuring devices. Flowmeters are, for example, electromagnetic flowmeters for measuring the flow of a medium through a measuring tube. Industrial processes are controlled by control and/or guidance systems using actuators and sensors. Only the central controllability of actuators and sensors by control and/or guidance systems makes process automation meaningfully possible.

Communication between the sensors and actuators, on the one hand, and the control and/or guidance systems, on the other hand, is required for control. Communication between sensors and actuators is often necessary. For this reason, the sensors, actuators and control and/or guidance systems of an industrial system are usually designed as bus subscribers that communicate with each other via a bus and thus form a bus communication system. A bus requires a transmission medium that is preferably wire-bound, i.e. has electrical conductors. Communication is the transmission of data, i.e. information. This data can be user data, such as measured values and parameter values, or instructions, such as instructions to perform a measurement to determine a measured value, to set a parameter value to calibrate a measuring instrument or to transmit a bus message. Preferably, the sensors and actuators are also designed as field devices. Bus subscribers have a bus interface for connection and communication via the bus.

Bus communication between bus subscribers is carried out according to a bus protocol. The bus protocol defines bus messages with a bus data area. In the bus data area, any data is transmitted between bus subscribers. The data in the bus data area are, for example, user data or instructions. For example, the first bus subscriber writes data into the bus data area of a bus message, if the bus message is then transmitted from the first bus subscriber to the second bus subscriber, the second bus subscriber reads the data from the bus data area and processes it. The writing, transmission and reading of bus messages is defined in the bus protocol. The processing of the read data is, for example, left to the design of the bus subscriber.

Since errors occur during the transmission of bus messages and also during the processing of bus messages, error management is necessary, including, in particular, the identification of errors. For this, the bus protocol defines at least one bus error code. According to this definition, errors are assigned bus error codes. If a bus subscriber detects an error, this bus subscriber writes the error code assigned to this error into the bus data area of a bus message. The bus subscriber is designed to detect errors and to write the bus error code belonging to the detected error into the bus data area of a bus message. After the transmission of such a bus message to another bus subscriber, this other bus subscriber identifies the error by evaluating the bus error code in the bus data area of the bus message. An error is an unwanted deviation and occurs, for example, when a bus message is transmitted via the bus in the bus message or when a bus message is processed in a bus subscriber.

However, bus protocols known from the prior art assign the same bus error code to different errors and/or do not even assign a bus error code to all errors. If the same bus error code is assigned to different errors, then the identification of the error by means of the bus error code is not clear, i.e. inaccurate. If no bus error code is assigned to an error, then this error cannot be identified by means of a bus error code. Consequently, the error detected by the bus subscriber cannot be identified clearly or not at all by the other bus subscriber by evaluating the bus error code, which impairs error management. Adding further bus error codes to the bus protocol is often not possible in order not to impair the compatibility of the bus protocol.

SUMMARY

The object of this invention is therefore to provide a method for error management in bus communication and a bus communication system in which error management is improved compared to the prior art and which is compatible with the bus protocol. An improvement is given, in particular, when the identification of errors is improved. The identification of errors is improved, for example, when further errors can be identified and/or errors can be identified more precisely.

The object is achieved by a method of the type described by the teaching according to the present invention. According to the teaching, the following method steps are carried out if the first bus subscriber detects the error mentioned at the beginning:

In a first method step, the first bus subscriber stores an error identification of the error in the first bus subscriber amending the bus error code, generates a first bus message and writes the bus error code into the bus data area of the first bus message.

In a second method step, the first bus message is transmitted from the first bus subscriber to the second bus subscriber.

In a third method step, a second bus message with a request for transmission of the error identification is generated by the second bus subscriber triggered by the bus error code.

In a fourth method step, the second bus message is transmitted from the second bus subscriber to the first bus subscriber.

In a fifth method step, a third bus message is generated by the first bus subscriber triggered by the request and the stored error identification is written into the bus data area of the third bus message.

In a sixth method step, the third bus message is transmitted from the first bus subscriber to the second bus subscriber.

In a seventh method step, the second bus subscriber identifies the error by evaluating the bus error code and the error identification.

The method steps use the existing bus protocol. All bus messages, in particular the first, second and third bus message, are bus messages according to the bus protocol. When, i.e. after, the error has been detected by the first bus subscriber, the described process steps are executed. The chronological sequence of the process steps results from the respective prerequisites of the respective method step.

The method according to the invention has various advantages over the methods for error management known from the prior art. Error identification is not limited by the bus protocol. The method is based on the existing bus protocol and is compatible with it. Changes and/or amendments to the bus protocol are not necessary. The method enables error identification of errors that are not provided for in the bus protocol. It also enables more precise error identification than is provided for in the bus protocol.

Even if only one bus error code and one error are discussed, the method is not limited to these. Rather, the method is also suitable for several bus error codes and errors. For example, the first bus subscriber detects various errors one after the other. The corresponding bus error code is then assigned to each error and the corresponding error identifications are stored. Each of the errors triggers the described method.

It is provided in one design of the method according to the invention that the error is caused by a request bus message that is transmitted from the second bus subscriber to the first bus subscriber. In terms of time, the request bus message is before the first bus message. The request bus message is another bus message according to the bus protocol. The request bus message causes the error, for example, because the bus data area contains data that contains incorrect user data for the first bus subscriber or incorrect instructions.

In a further design it is provided that the stored error identification is deleted after the transmission of the third bus message. In a further configuration it is provided that the stored error identification is deleted if the bus message immediately following the first bus message does not contain a request for transmission of the error identification. The two above designs ensure, especially in combination with one another, that the error identification associated with an error that has occurred is always stored.

In a further design, it is provided that the error identification is signaled within the scope of the evaluation. The error identification is signaled, for example, by displaying the error identification on a display device such as a light source or a display.

In a further design, it is provided that measures to compensate for the error are carried out by the second bus subscriber. The measures for compensation take place within the scope of the evaluation and follow the identification of the error. Preferably, the measures are adapted to the identified error. If the error identification indicates, for example, that the error occurred during the transmission of a bus message, this bus message is transmitted again according to a first measure.

In a further design, it is provided that the first bus subscriber and/or the second bus subscriber is/are brought into a secure state if an error impairing the proper functioning of the first and/or the second bus subscriber is identified during evaluation. Since the second bus subscriber evaluates the error identification, the second bus subscriber also identifies an error that impairs the proper functioning of the first and/or second bus subscriber. The proper functioning of the bus subscribers is no longer given, for example, if the bus protocol is no longer implemented by one of the bus subscribers. In particular, a secure state of a bus subscriber is an energy-free state, i.e. a switched-off state.

In a further design, it is provided that when the third bus message is generated, a first bus data field and a second bus data field are arranged in the bus data area, that a first part of the error identification is stored in the first bus data field and a second part of the error identification is stored in the second bus data field, and that the second part of the error identification determines the first part of the error identification more precisely. The division of the error identification into the first and the second part is advantageous, as this provides an efficient evaluation of the error identification. For a first rough error identification, only the first bus data field is evaluated and, if a more precise error identification is necessary, the second bus data field is also evaluated.

Often the error relates to access to data in a memory. The memory, for example, is a memory in the first bus subscriber. In a further design it is thus provided that when the third bus message is generated, an address bus data field is arranged in the bus data area of the third bus message and an address of the data in the memory is stored in the address bus data field. If the error now relates to access to data in a memory and a corresponding error identification is assigned to the error, the address bus data field is also evaluated when the error identification is evaluated in the bus data area. In this manner, a simple identification of errors is possible if they relate to the memory.

It is provided in a further design that a Modbus protocol is implemented as the bus protocol. The Modbus protocol is predestined as the bus protocol, since the Modbus protocol defines only a small number of bus error codes. In particular, the bus error code 0x04 "Server Device Failure" of the Modbus protocol is useful as the bus error code that causes the second bus subscriber to generate the second bus message. This is because this bus error code is provided according to the Modbus protocol for a large number of errors, which impairs the identification of these errors.

The object is also achieved with a bus communication system of the type described by the teaching according to the present invention.

According to this teaching, the first bus subscriber is designed, on the one hand, triggered by the identification of the error to store an error identification of the error in the first bus subscriber amending the bus error code, and designed, on the other hand, triggered by receiving a request in a second bus message to generate a third bus message and to write the error identification in the bus data area of the third bus message. Furthermore, the second bus subscriber is formed, on the one hand, to generate the second bus message with the request for transmission of the error identification triggered by receiving the bus error code in the first bus message, and, on the other hand, to identify the error for error management by evaluation of the bus error code and the error identification.

In one design of the bus communication system according to the invention, it is provided that the bus communication system is designed to carry out one of the methods described above.

The explanations in respect to the method apply accordingly for the bus communication system and vice versa.

BRIEF DESCRIPTION OF THE DRAWINGS

In detail, there is a large number of possibilities for designing and further developing the method for error management and the bus communication system. Reference is made to the following description of a preferred embodiment in conjunction with the drawings.

DETAILED DESCRIPTION

Figure 1:
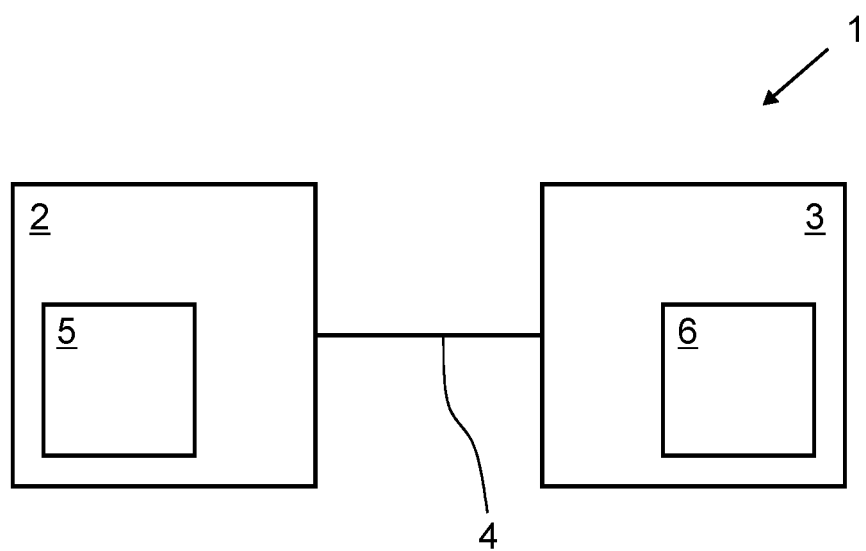
FIG. 1 illustrates an embodiment of a bus communication system.

FIG. 1 shows an embodiment of a bus communication system 1 used in process automation. It has a first bus subscriber 2, a second bus subscriber 3 and a wire-bound bus 4. The first bus subscriber 2 is an electromagnetic flowmeter, designed as a field device and has a memory 5. The second bus subscriber 3 is a control system and has a display 6. The second bus subscriber 3 controls the first bus subscriber 2.

The first bus subscriber 2 and the second bus subscriber 3 are designed for bus communication with each other via the bus 4 according to a Modbus protocol. According to the Modbus protocol, the first bus subscriber 2 is a server and the second bus subscriber 3 is a client. The Modbus protocol defines both bus error codes and bus messages. A bus error code according to the Modbus protocol is the bus error code 0x04 "Server Device Failure". This bus error code is assigned to various errors, which is why the identification of an error is not clear for error management based only on the bus error code. This impairs error management. Each bus message 7 has a bus data area 8, see FIG. 2. In the bus data area 8, arbitrary data is transmitted between the first bus subscriber 2 and the second bus subscriber 3. The data in the bus data area 8 is, for example, user data or instructions.

Figure 2:
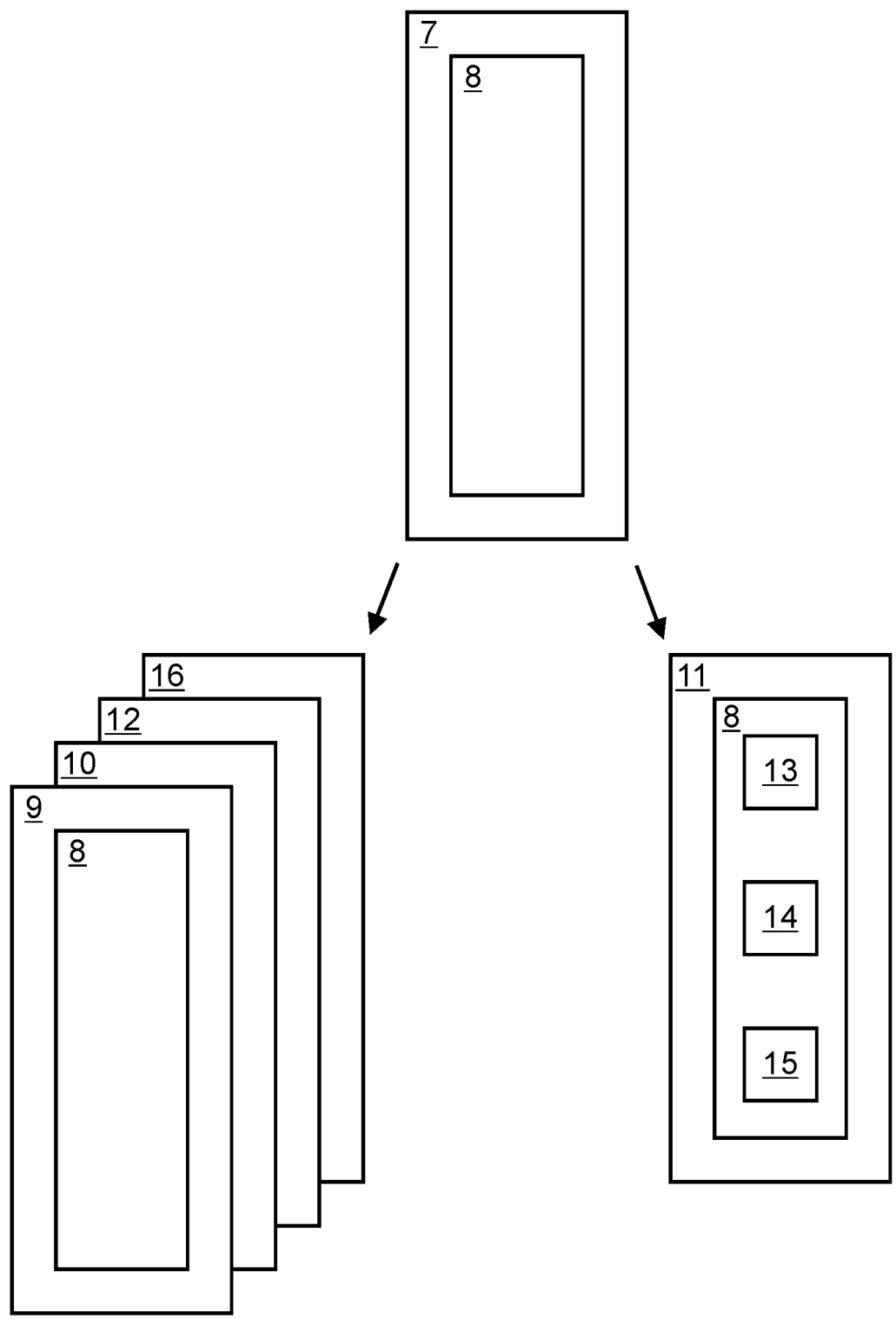
FIG. 2 illustrates bus messages according to a bus protocol.

The first bus subscriber 2 is designed to detect errors and is triggered by the detection of an error to generate a first bus message 9, see FIG. 2, and to write the bus error code belonging to the detected error in the bus data area 8 of the first bus message 9. For example, it is an error to which the bus error code 0x04 is assigned according to the Modbus protocol. The second bus subscriber 3 is designed to identify the error by evaluating the bus error code as far as possible according to the Modbus protocol.

Furthermore, the first bus subscriber 2 is designed, triggered by the identification of the error, to store an error identification of the error amending the bus error code in the first bus subscriber 2, and is designed, triggered by receiving a request in a second bus message 10, see FIG. 2, to generate a third bus message 11, see FIG. 2, and to write the error identification in the bus data area 8 of the third bus message 11. The first, second and third bus messages are bus messages according to the Modbus protocol.

Furthermore, the second bus subscriber 3 is designed, triggered by receiving the bus error code in the first bus message 9, to generate the second bus message 10 with the request for transmission of the error identification, and is designed to identify the error for error management by evaluating the bus error code and the error identification. Due to further identification by means of error identification, the error is identified more accurately than with the bus error code alone.

During operation of the bus communication system 1, a request bus message 12, see FIG. 2, is first transmitted from the second bus subscriber 3 to the first bus subscriber 2 in this embodiment. The request bus message 12 is another bus message according to the Modbus protocol. In the bus data area 8, it contains the instruction from the second bus subscriber 3 to the first bus subscriber 2 to transmit the measured value at an address in the memory 5 of the first bus subscriber 2 to the second bus subscriber 3. However, no measured value is stored at this address, which is why the request bus message 12 causes an error in the first bus subscriber 2. According to the Modbus protocol, the bus error code 0x04 is assigned to this error.

Figure 3:
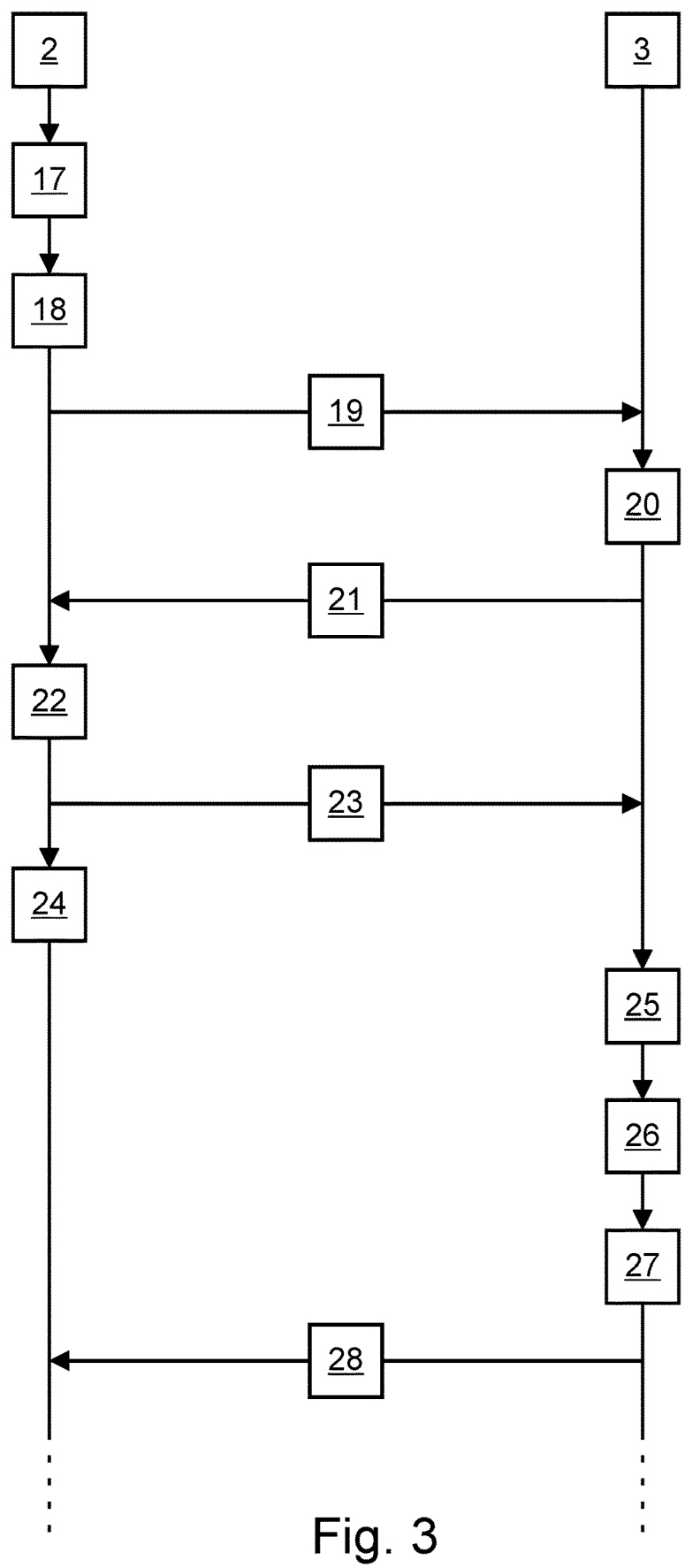
FIG. 3 illustrates a flow chart of a method.

During operation, the bus communication system 1 carries out an error management method with the following method steps, see FIG. 3:

In a first method step 17, the error is detected by the first bus subscriber 2. The detection includes the assignment of the bus error code 0x04 to this error.

In a second method step 18, the first bus subscriber 2 again stores an error identification of the error in the first bus subscriber 2 amending the bus error code, generates a first bus message 9, see FIG. 2, and writes the bus error code in the bus data area 8 of the first bus message 9.

In a third method step 19, the first bus message 9 is transmitted from the first bus subscriber 2 to the second bus subscriber 3.

In a fourth method step 20, a second bus message 10, see FIG. 2, with a request for transmission of the error identification is generated by the second bus subscriber 3 as a result of the bus error code.

In a fifth method step 21, the second bus message 10 is transmitted from the second bus subscriber 3 to the first bus subscriber 2.

In a sixth method step 22, a third bus message 11, see FIG. 2, is generated by the first bus subscriber 2 as a result of the request, and the stored error identification is written to the bus data area 8 of the third bus message 10.

The error identification has a first and a second part, wherein the second part defines the first part more precisely. Accordingly, when generating the third bus message 11, see FIG. 2, a first bus data field 13 and a second bus data field 14 are arranged in the bus data area 8. The first part of the error identification is stored in the first bus data field 13 and the second part of the error identification in the second bus data field 14. Since the error relates to access to data in a memory 5, an address bus data field 15 is also arranged in the bus data area 8 when the third bus message 11 is generated and an address of the data in the memory 5 is stored in the address bus data field 13.

In a seventh method step 23, the third bus message 11 is transmitted from the first bus subscriber 2 to the second bus subscriber 3.

In an eighth method step 24, the previously stored error identification is deleted by the first bus subscriber 2 after the transmission of the third bus message 11.

In a ninth method step 25, the second bus subscriber 3 identifies the error by evaluating the bus error code and the error identification. The division of the error identification into the first and the second part is advantageous, as this provides an efficient evaluation of the error identification. A rough error identification is already possible after the evaluation of the first bus data field 13. A more precise error identification then results after evaluation of the second bus data field 14. When evaluating the error identification in the bus data area 8, the address bus data field 15 is also evaluated. In this manner, a simple identification of the error is possible, since the address is known. This error identification in the bus data area 8 is not subject to the limitations of the Modbus protocol. Therefore, a more precise error identification of errors is possible than provided for in the Modbus protocol. The method is based on the existing Modbus protocol and is compatible with it. Changes or amendments to the Modbus protocol are not necessary. The bus messages are transmitted according to the Modbus protocol.

In a tenth method step 26, the second bus subscriber 3 takes measures to compensate for the error. The measures for compensation are carried out within the scope of the evaluation. In this case, a further request bus message 16, see FIG. 2, is transmitted from the second bus subscriber 3 to the first bus subscriber 2, which has a corrected address.

In an eleventh method step 27, the error identification and the address are signaled within the scope of the evaluation by a display device in the form of the display 6. This is used to inform a user.

In a twelfth method step 28, the first bus subscriber 2 is brought into a secure state by the second bus subscriber 3 if the measures for compensating the error remain unsuccessful. This is because the second bus subscriber 3 evaluates the error in such a way that a proper functioning of the first bus subscriber 2 is impaired by the error. The secure state is achieved by switching off the first bus subscriber 2.

The invention claimed is:

1. A method for error management in bus communication according to a bus protocol between a first bus subscriber and a second bus subscriber, wherein the bus protocol defines at least one bus error code for error and bus messages with a bus data area, the method comprising:
    detecting an error by the first bus subscriber;
    the first bus subscriber storing an error identification of the error in the first bus subscriber amending the bus error code, generating a first bus message and writing the bus error code into the bus data area of the first bus message;
    transmitting the first bus message from the first bus subscriber to the second bus subscriber;
    the second bus subscriber generating a second bus message with a request for transmission of the error identification triggered by the bus error code;
    transmitting the second bus message from the second bus subscriber to the first bus subscriber;
    the first bus subscriber generating a third bus message triggered by the request and writing the stored error identification into the bus data area of the third bus message;
    transmitting the third bus message from the first bus subscriber to the second bus subscriber; and
    the second bus subscriber identifying the errors by evaluating the bus error code and the error identification.

2. The method of claim 1, wherein the error is caused by a request bus message transmitted from the second bus subscriber to the first bus subscriber.

3. The method of claim 2, further comprising deleting the stored error identification after the transmission of the third bus message.

4. The method of claim 2, further comprising deleting the stored error identification if the bus message immediately following the first bus message does not contain a request for transmission of the error identification.

5. The method of claim 2, further comprising signaling the error identification within a scope of the evaluation.

6. The method of claim 2, wherein measures for compensating the error are carried out by the second bus subscriber.

7. The method of claim 2, further comprising bringing at least one of the first bus subscriber and the second bus subscriber into a secure state if, during evaluation, an error that impairs the proper functioning of at least one of the first bus subscriber and the second bus subscriber is identified.

8. The method of claim 2, wherein when the third bus message is generated, a first bus data field and a second bus data field are arranged in the bus data area;
    wherein a first part of the error identification is stored in the first bus data field and a second part of the error identification is stored in the second bus data field; and
    wherein the second part of the error identification further specifies the first part of the error identification.

9. The method of claim 2, wherein the error relates to access to data in a memory, wherein, when the third bus message is generated, an address bus data field is arranged in the bus data area and an address of the data in the memory is stored in the address bus data field.

10. The method of claim 1, further comprising deleting the stored error identification after the transmission of the third bus message.

11. The method of claim 1, further comprising deleting the stored error identification if the bus message immediately following the first bus message does not contain a request for transmission of the error identification.

12. The method of claim 1, further comprising signaling the error identification within a scope of the evaluation.

13. The method of claim 1, wherein measures for compensating the error are carried out by the second bus subscriber.

14. The method of claim 1, further comprising bringing at least one of the first bus subscriber and the second bus subscriber into a secure state if, during evaluation, an error that impairs the proper functioning of at least one of the first bus subscriber and the second bus subscriber is identified.

15. The method of claim 1, wherein when the third bus message is generated, a first bus data field and a second bus data field are arranged in the bus data area;
    wherein a first part of the error identification is stored in the first bus data field and a second part of the error identification is stored in the second bus data field; and
    wherein the second part of the error identification further specifies the first part of the error identification.

16. The method of claim 1, wherein the error relates to access to data in a memory, wherein, when the third bus message is generated, an address bus data field is arranged in the bus data area and an address of the data in the memory is stored in the address bus data field.

17. The method of claim 1, wherein a Modbus protocol is implemented as the bus protocol.

18. A bus communication system, comprising:
    a first bus subscriber;
    a second bus subscriber; and
    a bus;
    wherein the first bus subscriber and the second bus subscriber are designed for bus communication with one another via the bus according to a bus protocol;
    wherein the bus protocol defines at least one bus error code for an error and bus messages with a bus data area;

wherein the first bus subscriber is designed to identify the error and is designed to generate a first bus message and to write the bus error code into the bus data area of the first bus message triggered by the detection of the error;

wherein the second bus subscriber is designed to identify the error by evaluating the bus error code;

wherein, triggered by the identification of the error, the first bus subscriber is designed to store an error identification of the error in the first bus subscriber amending the bus error code, and, triggered by receiving a request in a second bus message, is designed to generate a third bus message and to write the error identification in the bus data area of the third bus message;

wherein, triggered by receiving the bus error code in the first bus message, the second bus subscriber is designed to generate the second bus message with the request for transmission of the error identification, and is designed to identify the error for error management by evaluating the bus error code and the error identification.

19. The bus communication system according to claim 18, wherein the bus communication system is designed to carry out a method including the steps:

detecting an error by the first bus subscriber;

the first bus subscriber storing an error identification of the error in the first bus subscriber amending the bus error code, generating a first bus message and writing the bus error code into the bus data area of the first bus message;

transmitting the first bus message from the first bus subscriber to the second bus subscriber;

the second bus subscriber generating a second bus message with a request for transmission of the error identification triggered by the bus error code;

transmitting the second bus message from the second bus subscriber to the first bus subscriber;

the first bus subscriber generating a third bus message triggered by the request and writing the stored error identification into the bus data area of the third bus message;

transmitting the third bus message from the first bus subscriber to the second bus subscriber; and the second bus subscriber identifying the errors by evaluating the bus error code and the error identification.

* * * * *